(12) United States Patent
Creswell et al.

(10) Patent No.: US 6,394,127 B1
(45) Date of Patent: May 28, 2002

(54) FAUCET AND VALVE FOR A WATER FILTRATION SYSTEM

(75) Inventors: Robert S. Creswell; Jimmie D. Chrysler, both of Grand Rapids, MI (US)

(73) Assignee: Amerikam, Inc., Grand Rapids, MI (US)

( * ) Notice: Subject to any disclaimer, the term of this patent is extended or adjusted under 35 U.S.C. 154(b) by 0 days.

(21) Appl. No.: 09/830,246

(22) PCT Filed: Oct. 22, 1999

(86) PCT No.: PCT/US99/24610

§ 371 (c)(1),
(2), (4) Date: Apr. 23, 2001

(87) PCT Pub. No.: WO00/23168

PCT Pub. Date: Apr. 27, 2000

Related U.S. Application Data

(60) Provisional application No. 60/105,213, filed on Oct. 22, 1998.

(51) Int. Cl.⁷ ........................ B01D 35/04; F16K 11/074
(52) U.S. Cl. ................ 137/544; 137/625.46; 210/424
(58) Field of Search ..................... 137/544, 625.46; 210/424

(56) References Cited

U.S. PATENT DOCUMENTS

| 3,863,675 | A | * | 2/1975 | Wiltshire | ............... 137/625.46 |
| 4,115,276 | A | * | 9/1978 | Kelly | ........................ 210/425 |
| 5,452,744 | A | * | 9/1995 | Otto | ..................... 137/625.24 |

FOREIGN PATENT DOCUMENTS

| EP | 0322167 A1 | * | 9/1989 |
| EP | 0795703 A1 | * | 9/1997 |
| JP | 60109676 | | 6/1985 |

* cited by examiner

*Primary Examiner*—John Rivell
(74) *Attorney, Agent, or Firm*—McGarry Bair LLP (57) ABSTRACT

A water faucet assembly comprises a spout, a water supply port, a filter, and a valve. Fluid flow is stopped, between the water supply port and the filter inlet, before fluid communication is closed, between the filter outlet and the spout, as the valve is moved from on to off position when the water supply port is connected to a water source.

19 Claims, 4 Drawing Sheets

FAUCET AND VALVE FOR A WATER FILTRATION SYSTEM

CROSS REFERENCE TO RELATED APPLICATIONS

This application claims the benefit of U.S. Provisional Patent Application Ser. No. 60/105,213, filed Oct. 22, 1998.

BACKGROUND OF THE INVENTION

1. Field of the Invention

The invention relates to a faucet for a water filtration system, and, more specifically, a faucet having a valve controlling the flow of water from the water source, through a filter of the filtration system, and out the spout of the faucet in such a manner as to prevent backpressure from the water in the filter causing the faucet to drip when the valve is turned off.

2. Related Art

Water filtration systems are commonly used in the home to treat water from a conventional water supply. Such systems typically comprise a faucet with a spout fluidly connected to a valve. The valve is also fluidly connected to a water supply inlet and a filter inlet. The valve operates to direct the water from the water supply out through the filter and back to the spout for dispensing.

A common problem of faucets in water filtration systems is that fluid flow from the filter outlet to the spout ceases prior to or simultaneously with cessation of fluid flow from the water supply to the filter. The result is frequently an elevated water pressure in the filter. This constant backpressure puts additional stress on the valve seals and often results in leakage through the spout until the backpressure is relieved.

An additional problem of the present faucet designs is occasional dribbling that lingers after flow through the valve is stopped when the faucet is in the OFF position. It is believed that this is caused by weak or ineffective seals and valves.

SUMMARY OF THE INVENTION

The invention relates to a water faucet assembly for dispensing filtered water from an unfiltered water source. The water faucet assembly comprises a spout fluidly connected to a filter by a valve. The spout has an inlet for receiving water to be directed through the spout. A water supply port is provided to supply fluid to the faucet from a water source. The filter has an inlet that receives unfiltered water from the water supply port and an outlet for dispensing the filtered water. The valve is movable between an ON position, an intermediate position, and an OFF position. In the ON position, the filter inlet is fluidly connected to the water supply port and the filter outlet is fluidly connected to the spout inlet. In the intermediate position, the filter outlet is fluidly connected to the spout inlet and the filter inlet is fluidly disconnected from the water supply port. In the OFF position, the filter outlet is fluidly disconnected from the spout inlet and the filter inlet is fluidly disconnected from the water supply port. When the water supply port is connected to a water source, fluid flow is stopped between the water supply port and the filter inlet before fluid communication is closed between the filter outlet and the spout inlet as the valve is moved from the ON position to the OFF position.

The valve preferably comprises a fixed disk and a rotating disk, both of which can be positioned within a valve body. The fixed disk has a source opening that is fluidly connected to a source of unfiltered water, a filter inlet opening fluidly connected to the filter inlet, a filter outlet opening fluidly connected to the filter outlet, and a spout opening fluidly connected to the spout inlet. The rotating disk has a source passage capable of fluidly connecting and disconnecting the source opening and the filter inlet opening upon the rotation of the rotating disk, along with a dispensing passage capable of fluidly connecting and disconnecting the filter inlet opening and the source inlet upon rotation of the rotating disk.

The invention also relates to a valve for controlling the flow of water from a water source, through a filter, into a spout so that the flow from the water source is shut off prior to cessation of flow from the filter relative to the spout wherein the spout has an inlet for receiving filtered water from the filter and the filter has an inlet for receiving unfiltered water from a water source and an outlet for dispensing filtered water to the spout. The valve comprises a fixed disk having a supply port adapted to be fluidly connected to a water source, a filter inlet opening adapted to be fluidly connected to a filter inlet, a filter outlet opening adapted to be fluidly connected to a filter outlet, and a spout opening adapted to fluidly connected to a spout. The rotating disk is rotatable relative to the fixed disk between ON and OFF positions. The rotating disk comprises a source passage and a dispensing passage, where in the ON position, the source passage fluidly connects the supply port and the filter inlet opening and the dispensing passage fluidly connects the filter outlet and the spout opening. In the OFF position, the source passage fluidly disconnects the source opening and the filter inlet opening and the dispensing passage fluidly disconnects the filter outlet opening from the spout opening, and intermediate the ON and OFF positions, the source passage fluidly disconnects the source opening and the filter inlet opening while the dispensing passage fluidly disconnects the filter outlet opening and the spout opening.

DETAILED DESCRIPTION

Figures 1, 2:
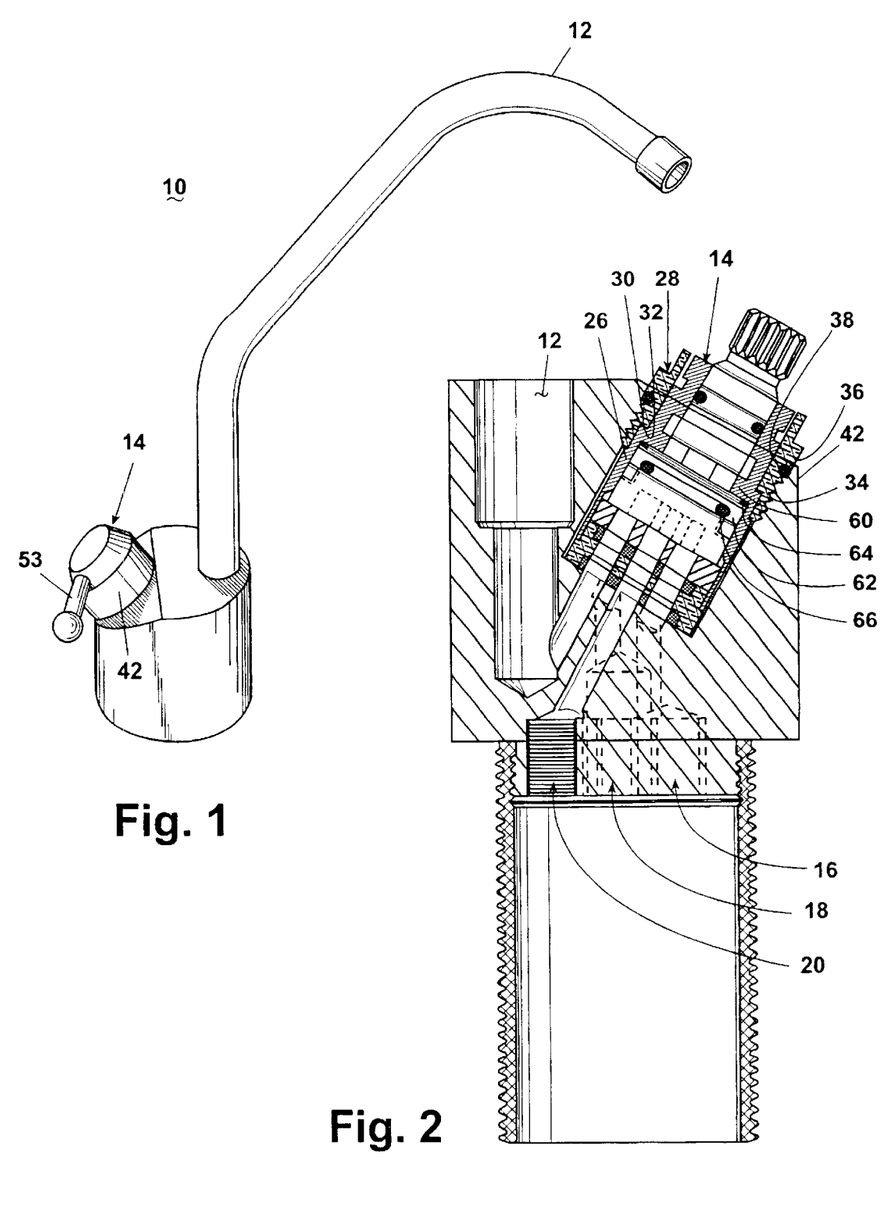
FIG. 1 illustrates a faucet including a spout and valve according to the invention.
FIG. 2 is a sectional view of the valve of FIG. 1, showing the water supply line, filter inlet line, filter supply line, and spout connections to the valve.

FIGS. 1 and 2 illustrate a faucet 10 having a spout 12 and a valve 14. The valve 14 controls the flow of water to the spout 12 from a water supply outlet 16, by way of a filter inlet 18 and a filter outlet 20. A conventional water filter (not shown) is fluidly connected between the filter inlet 18 and the filter outlet 20 where the water is filtered. The valve controls the flow of filtered water from the filter outlet 20 to the spout 12 where it is dispensed for use.

The water supply that supplies water to the water supply outlet is not shown as it is of a common and well-known type. Any suitable water supply will function with the invention, and the invention is not dependent upon the type of water supply. Similarly, the water filtration system for filtering the supply water is also not shown. The type of filtration system is not important to the invention. Any suitable type of water filtration system can be used in the invention.

Figure 3:
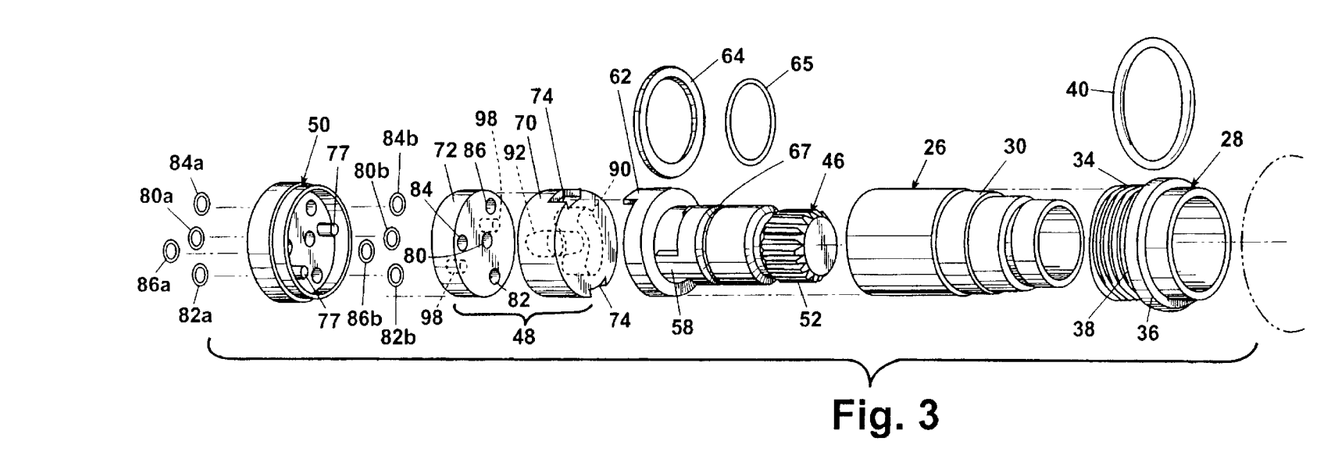
FIG. 3 is an exploded view of the valve including a fixed and rotatable ceramic disk according to the invention.

Referring to FIGS. 2 and 3, the valve 14 is described in greater detail. The valve 14 comprises a cartridge body 26 and a faucet adapter 28, both of which form the outer structure or housing of the valve 14. The cartridge body 26 has a stepped collar 30 against which is received a shoulder 32 of the faucet adapter 28 when the faucet adapter 28 is mounted to the cartridge body 26.

The faucet adapter also includes external threads 34 and a stop collar 36, between which is formed a channel 38 that receives an O-ring 40. The adapter permits the cartridge body to be threadably mounted to the faucet, preferably at a base 42. The stop collar 36 abuts the upper surface of the base to limit the insertion of the valve 14 into the faucet 10, and the O-ring 40 fluidly seals the valve 14 with respect to the faucet base 42.

A handle shaft assembly 46 and ceramic valve stack 48 are retained within the annular cartridge body 26 by a retainer 50. The handle assembly 46 comprises a toothed top 52 that meshes with a handle 53 for rotating the handle assembly 46 between OFF and ON positions. The handle shaft assembly 46 has a stop 58 adapted to abut radial protrusions 60 on the inside of the cartridge body to limit the rotational movement of the handle shaft assembly. For the valve 14, it is preferred that the stops permit the rotation of the handle shaft assembly through approximately 90°. The handle shaft assembly terminates in a handle extension 62 that cooperates with the ceramic valve stack 48. A bearing 64, preferably a Deirin ring bearing, is provided between the handle extension 62 and the radial projections 60 within the annular cartridge body 26. An O-ring 65 is provided in an annular groove 67 to seal the handle shaft assembly to the interior of the body 26.

The ceramic valve stack 48 comprises a rotatable ceramic disk 70 and a fixed ceramic disk 72. The general concept of a rotatable ceramic valve stack with a positively controlled stack pressure is disclosed in U.S. Reissue Pat. No. 35,545, whose disclosure is incorporated by reference. The rotatable ceramic disk has slots 74 adapted to receive the handle extension 62 to couple the rotatable ceramic disk to the handle shaft assembly 46 whereby any rotational movement of the handle shaft assembly 46 results in a corresponding rotational movement of the rotatable ceramic disk 70. The fixed ceramic disk 72 abuts the rotatable ceramic disk 70 and is held in pressure against the rotatable ceramic disk 70 by the retainer 50. The retainer has locating pins 77 that are received within openings 98 in the fixed ceramic disk 72 to locate the retainer relative to the fixed disk.

Looking at the ceramic disks in greater detail, it can be seen that the fixed ceramic disk 72 has four through-holes 80, 82, 84, 86. The retainer 50 has corresponding through-holes. O-rings 80a–b, 82a–b, 84a–b, 86a–b corresponding to holes 80, 82, 84, 86, respectively, are disposed about their corresponding hole and on opposite sides of the retainer 50 to seal the retainer 50 to the fixed disk 72 and the corresponding supply outlet, filter inlet, filter outlet, and spout inlet.

The through-hole 82 is fluidly connected to the water supply outlet 16. The through-hole 80 is fluidly connected to the filter inlet 16. The through-hole 84 is fluidly connected to the filter outlet 20. The through-hole 86 is fluidly connected to the spout 12. The fixed ceramic disk 72 further includes a blind-hole (not shown), which is used to align the fixed disk during installation. The rotatable ceramic disk 70 has an arcuate blind opening 90 and an ovate blind opening 92.

In the preferred embodiment, the rotatable ceramic disk and the fixed ceramic disk both have the same diameter. The radius of the arcuate opening 90 extends the same distance from the center of the rotatable disk 70 as the center of the filter outlet through-hole 84 to the center of the spout through-hole 86. Thus, rotation of the rotatable ceramic disk 70 relative to the fixed disk 72 results in the arcuate opening 90 aligning with the filter outlet through-hole 84 and the spout through-hole 86 to permit fluid to flow from the filter outlet into the spout for dispensing. Similarly, the ovate opening 92 extends radially from the center of the rotatable ceramic disk 70 to an extent equal to the radial position of the supply inlet through-hole 82 on the fixed ceramic disk 72 thereby permitting the control of fluid from the supply inlet to the filter inlet.

Figure 4:
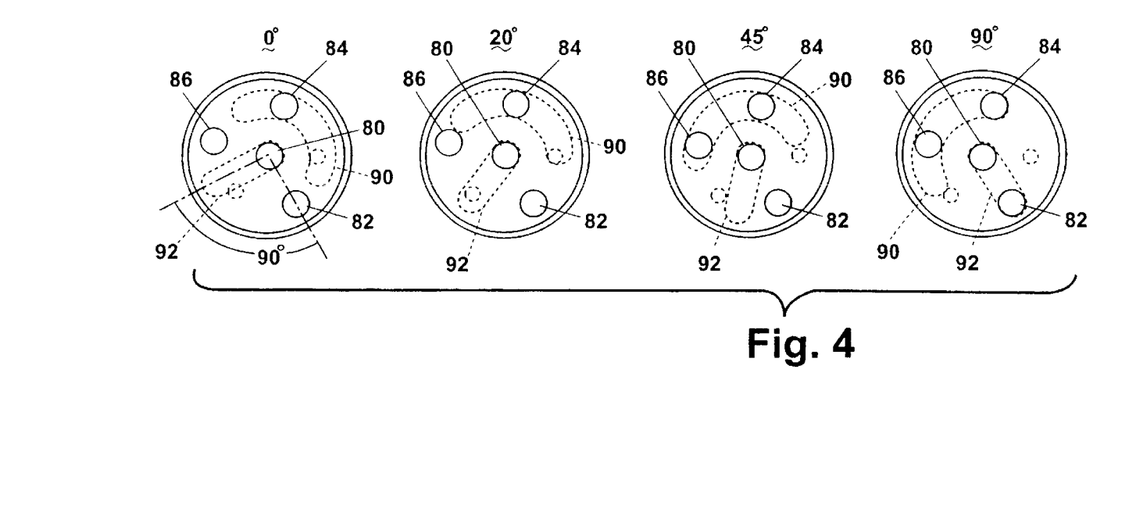
FIG. 4 illustrates the operationally important positions of the rotatable and fixed disks of FIG. 3.

The operation of the faucet 10 is described with respect to FIG. 4 which illustrates the functionally important operational positions of the valve 14 for 0°, 20°, 45°, and 90° of rotation of the handle shaft assembly 53. Specifically, the valve 14 is in the OFF position at the 0° position where all of the through-holes 80 through 86 are closed, i.e., out of communication with each other. In other words, the arcuate opening 90 of the rotatable ceramic disk 70 is aligned only with the filter outlet opening 84 and the ovate opening 92 is not aligned with the supply inlet through-hole 82. In this position, water entering the valve 14 from the water supply outlet 16 is blocked because the supply inlet through-hole 82 is blocked by the rotatable disk 70 and, thus, closed relative to the ovate blind opening 92, preventing fluid communication with the filter inlet through-hole 80. Similarly, the filter outlet through-hole 84 is not in communication with the spout through-hole 86. Thus, no water from the filter will reach the spout 12.

As the handle of the faucet is rotated to the 20° position, the rotatable ceramic disk 70 moves to a position where the arcuate blind opening 90 just begins to establish fluid communication between the spout 12 and the filter outlet 20 by opening both the filter outlet through-hole 84 and spout through-hole 86 to the blind opening 90, but without establishing fluid communication between the water supply outlet through-hole 82 and filter inlet through-hole 80. Thus, any fluid in the filter is free to flow out of the spout without more fluid entering the filter from the water supply.

As the handle is rotated to the 45° position, the spout through-hole 86 is in complete fluid communication with the filter outlet through-hole 84 by way of both being open to the arcuate blind opening 90, establishing complete fluid communication between the filter outlet 20 and the spout 12. The ovate opening 92 has not yet opened to the filter inlet through-hole 80 and the supply through-hole 82 to establish fluid communication between the water supply outlet 16 and the filter inlet 18. It is important that the filter outlet 20 be open, preferably completely open, to the spout 12 without the water supply 16 being connected to the filter inlet 18, especially when the valve is turned from ON to OFF.

As the handle is rotated to the 90° position, the elongate blind opening 92 opens to the supply through-hole 82 and the filter inlet through-hole 80 to establish fluid communication therebetween, resulting in the water supply being in fluid communication with the filter. Simultaneously, the filter outlet port 84 remains in fluid communication with the spout through-hole 86, resulting in fluid communication between the filter assembly and the spout. In the 90° or ON position, water is free to flow from the water supply through the valve 14 and out through the spout 12 for dispensing.

When it is desired to turn off the flow of water, the handle shaft assembly 46 is rotated in the opposite direction. The rotational positions are equally as important when the fluid is being turned off. As the handle shaft assembly 46 is rotated from the 90° to the 45° position, the flow from the water supply outlet 16 is shut off relative to the filter assembly first. However, the fluid flow from the filter assembly to the spout 12 still remains at least partially open subsequent to the cessation of flow from the water supply. The advantage of this position is that residual pressure within the filter is relieved prior to complete cessation of flow to the spout 12.

As the rotatable ceramic disk 70 is moved from the 45° position to the 20° position, fluid communication between the filter outlet through-hole 84 and the spout 12 is terminated. At this point, no water can flow from the water supply or the filter assembly through the spout for dispensing. Additionally, because the water in the filter assembly was permitted to flow out through the spout in the 45° position, there will be no backpressure in the filter assembly to force water from the filter assembly to the spout, avoiding the undesirable run-on associated with previous faucets.

In the 0° or OFF position, fluid communication between the water supply and the filter inlet and the filter outlet and the spout is completely terminated.

The sequence of the fluid flow through the spout and filter system during shut off (90° to 0°) yields several advantages, of which two are most important. First, the flow of supply water to the filter is terminated prior to the flow of water from the filter to the spout, relieving any backpressure that could cause a leak. Second, the positive shutting off of fluid communication between the filter and the spout prohibits any dripping from the spout of water in the filter. The combined benefits of terminating inflow to the filter prior to terminating filter outflow and subsequently positively terminating filter outflow increases the likelihood that no leaking or dribbling will occur.

Figure 5:
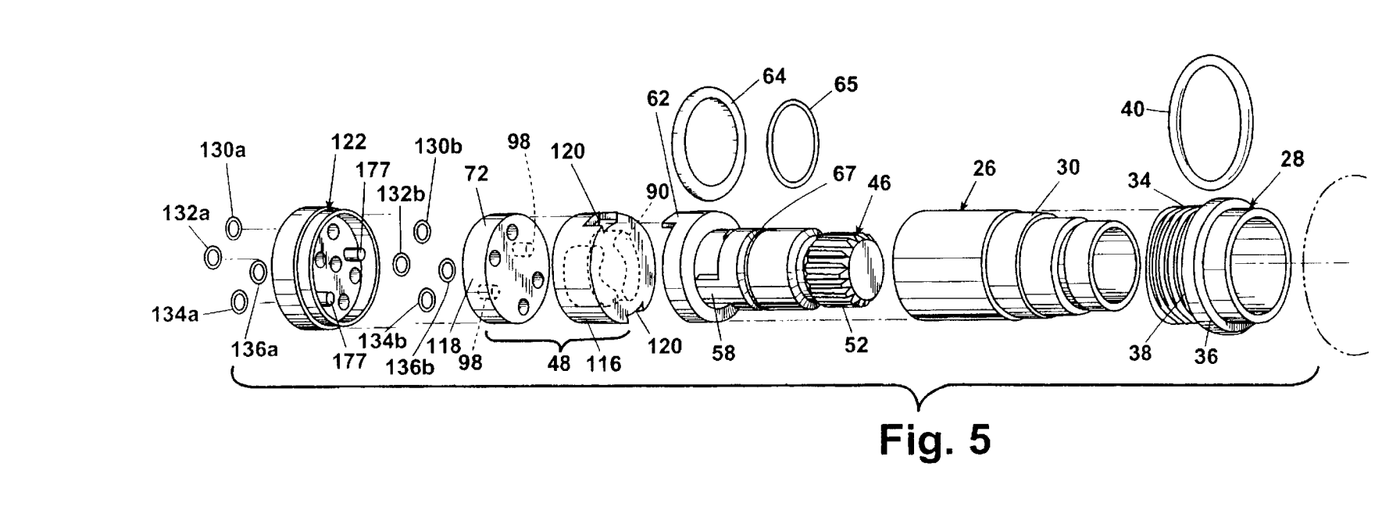
FIG. 5 illustrates an alternative embodiment of the valve of FIG. 3.

FIG. 5 illustrates an alternative embodiment valve 114 which is substantially identical to the valve 14, except that the rotatable ceramic disks have a different through-hole pattern and opening configuration, necessitating a different hole pattern in the retainer and its associated seals. Otherwise, the valve 114 is identical to the valve 14 and like parts will be identified by like numerals.

The valve 114 comprises a rotatable ceramic disk 116 and a fixed ceramic disk 118. The rotatable ceramic disk 116 has slots 120 adapted to receive the handle extension 62 to thereby permit the rotation of the rotatable ceramic disk 70 by rotating the handle shaft assembly 46.

The rotatable and fixed ceramic disks 116 and 118 are retained within the cartridge body 26 by a retainer 122 provided on the end of the cartridge body 26.

The stationary ceramic disk 118 has four through-holes 130, 132, 134, 136, with corresponding O-rings 130a–b, 132a–b, 134a–b, and 136a–b. The supply through-hole 130 is in fluid communication with the water supply outlet 16 and permits water from the water supply (not shown) to flow through the stationary ceramic disk. The filter inlet through-hole 132 is in fluid communication with the filter assembly inlet and permits water to flow to the filter of the filter assembly. The filter outlet through-hole 134 is in fluid communication with the filter assembly outlet and permits water leaving the filter to be in fluid communication with the stationary ceramic disk. The spout through-hole 136 is in fluid communication with the spout and permits water to flow to the spout from the stationary ceramic disk. The retainer 122 and seals 124, 126 all have openings that correspond to the through-hole pattern of the stationary ceramic disk 118. The retainer 122 has locating pins 177 that are received within openings 98 in the fixed ceramic disk 72 to locate the retainer relative to the fixed disk.

The rotatable ceramic disk 116 has a first blind arcuate opening 140, which is sized to fluidly connect the supply through-hole 130 to the filter inlet through-hole 132 during normal operation. A second blind arcuate opening 142 is also provided on the rotatable ceramic disk 116 and is sized to fluidly connect the filter outlet through-hole 134 to the spout through-hole 136, permitting the flow of water from the filter to the spout for dispensing.

Figure 6:
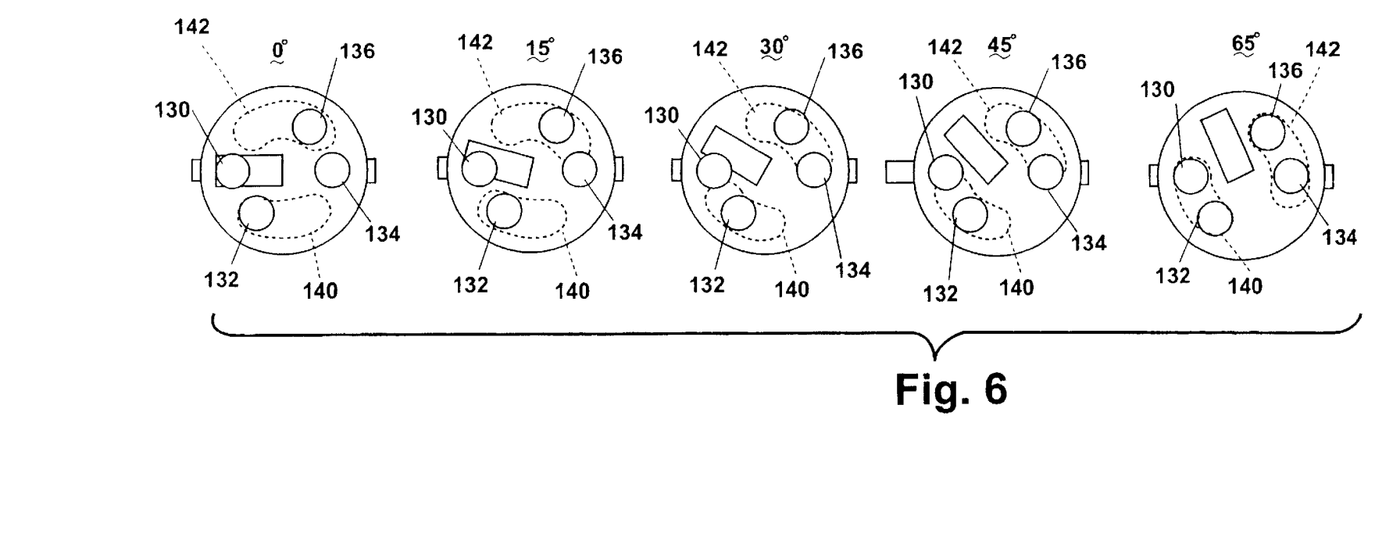
FIG. 6 illustrates the operationally important positions of the rotatable and fixed disks of FIG. 5.

The operation of the second embodiment valve 114 will be described with respect to FIG. 6, which illustrates the important operational positions of the valve 114. As can be seen, the valve 114 rotates between 0° and 65°. The range of rotation of the valve is limited by the stops between the handle shaft assembly 46 and the annular cartridge body 26. The 0° position illustrates the OFF position where there is no fluid communication between the water supply and the filter assembly because the supply through-hole 130 and filter inlet through-hole 132 are not in fluid communication. Similarly, there is no fluid communication between the filter assembly and the faucet because the filter outlet through-hole 134 is not in fluid communication with the spout through-hole 136.

As the rotatable ceramic disk 116 is rotated to the 15° position by the handle shaft assembly 46, the filter assembly just begins fluid communication with the spout because the dispensing opening 142 is in complete fluid communication with the spout through-hole 136 and just begins fluid communication with the filter outlet through-hole 134. However, in the 15°-rotation position, the supply opening 140 is only in fluid communication with the filter inlet through-hole 132, preventing the water supply from being in fluid communication with the filter assembly. An advantage of having the filter assembly in fluid communication with the spout while the supply is not in fluid communication with the filter assembly is that any pressurized fluid remaining in the filter assembly is permitted to flow through the spout without new water entering the filter assembly, effectively reducing any backpressure in the filter assembly.

As the rotatable ceramic disk 116 is rotated to the 30° position, the supply opening 140 partially overlies the supply through-hole 130 and completely overlies the filter inlet through-hole 132 to establish fluid communication between the water supply and the filter assembly. Simultaneously, the dispensing opening 142 substantially overlies the filter outlet through-hole 134 and completely overlies the spout through-hole 136 to continue the fluid communication between the filter assembly and the spout. In the 30° rotational position, water from the supply can pass into the filter assembly and out through the spout for dispensing.

In the 45° rotational position, the supply opening 140 substantially overlies the supply inlet through-hole 130 and completely overlies the filter inlet through-hole 132 and the dispensing opening 142 completely overlies both the filter outlet through-hole 134 and the spout inlet through-hole 136 to provide a greater flow of water from the supply to the spout for dispensing.

The 65° position illustrates the ON position where the supply opening 140 completely overlies the supply inlet through-hole 130 and the filter inlet through-hole 132 and the dispensing opening 142 completely overlies the filter outlet through-hole 134 and the spout inlet through-hole 136 and the valve 114 is completely open, providing the highest rate of water flow from the supply through the spout.

To return to the OFF position, the sequence of rotation is reversed. Thus, the valve moves from the ON position to the 45° and 30° rotational positions, which reduce the rate of water flow as the supply opening 140 overlies less and less of the supply outlet through-hole 130. Additionally, in moving from the ON position to the 45° and 30° rotational positions, the dispensing opening 142 overlies a smaller portion of the filter outlet through-hole 134, which also reduces the flow rate from the water supply to the spout. It is important to note that the portion of the supply through-hole 130 overlaid by the supply opening 140 is always less than the portion of the filter outlet through-hole 134 overlaid by the dispensing opening 142. In essence, the water from the supply is turned off or reduced earlier than the water exiting the filter assembly to the spout which permits the pressurized fluid in the filter assembly to be dispensed through the spout without the addition of an equal amount of supply water.

As the valve reaches the 15° rotational position during the shut off, the supply through-hole 130 is no longer in fluid communication with the supply opening 140, but the filter outlet through-hole 134 remains in partial fluid communication with the dispensing opening 142, thereby permitting the remaining pressurized fluid in the filter assembly to be dispensed through the spout and eliminating any backpressure in the filter assembly that could possible result in subsequent leaking after the valve is shut off. The valve 114 is then moved to the OFF position where the supply opening 140 only overlies the filter inlet through-hole 132 and the dispensing opening 142 only overlies the spout inlet through-hole 136, preventing any flow of water from the supply or the filter assembly through the spout.

The invention is advantageous over previous faucet and filtration combinations in that the valve according to the invention controls the flow of fluid from the water supply through the filtration system and out the faucet in such a manner that fluid flow from the water supply to the filtration system is terminated before fluid flow from the filter assembly to the spout, eliminating any pressurized water remaining in the filter assembly that could create a sufficient backpressure to permit the faucet to leak. Although the invention is shown in the context of a ceramic valve stack having one fixed disk with a particular through-hole configuration and a rotatable disk with flow control openings, these combinations of through-holes and flow control openings are only some of the possible arrangements. It is within the scope of the invention to have other through-hole orientations and flow opening configurations.

Figure 7:
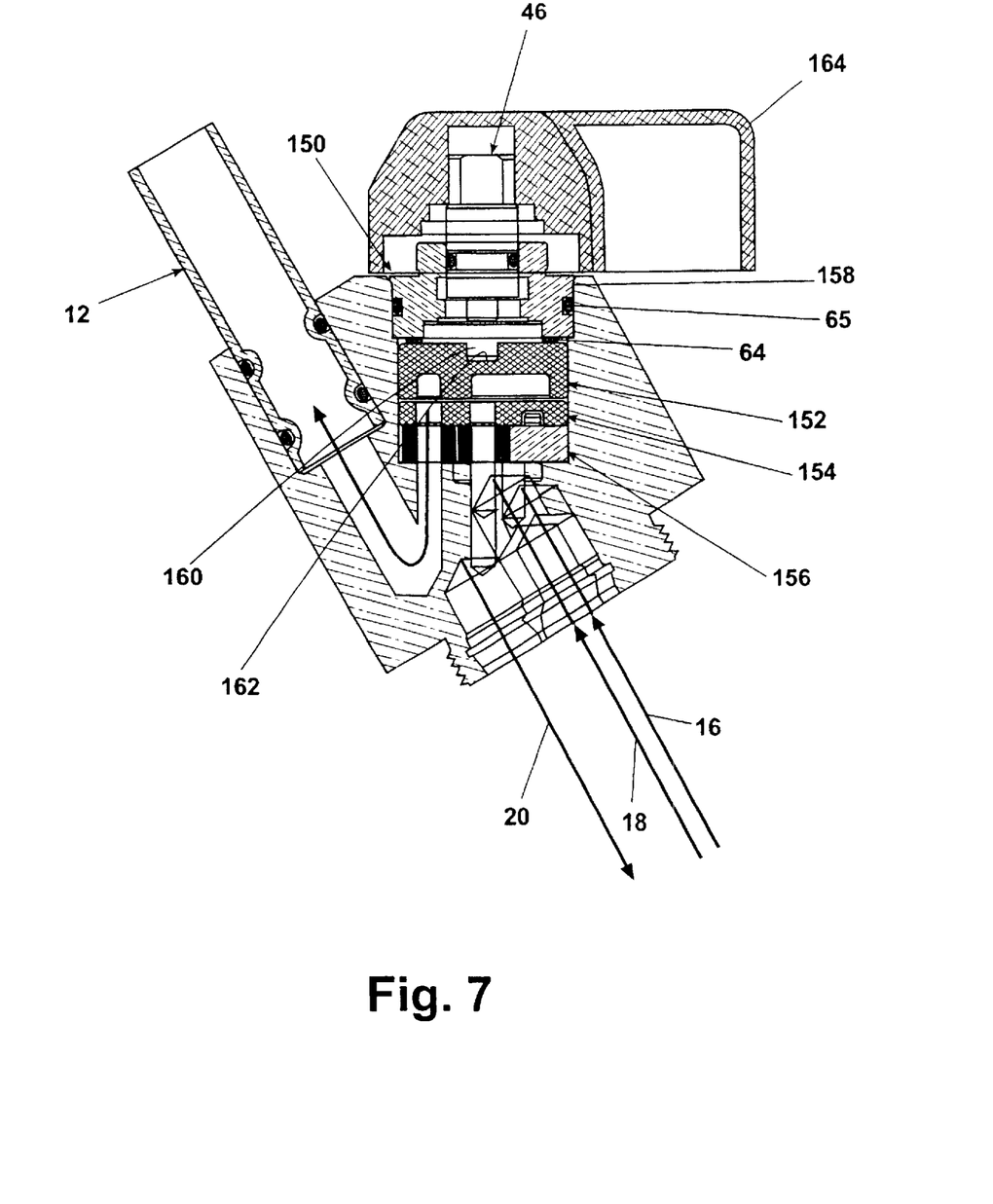
FIG. 7 illustrates an alternative valve construction.

FIG. 7 illustrates an alternative valve 150. The alternative valve 150 is substantially similar to the valve disclosed in FIG. 2, except that the alternative valve 150 does not require the annular cartridge body. Therefore, like numerals will be used to identify like parts and only a summary description of the alternative valve 150 will be provided.

The alternative valve 150 comprises a rotatable ceramic disk 152 and a fixed ceramic disk 154, which are sandwiched between a retainer 156 and a faucet adapter 158. A shaft assembly 46 extends through the faucet adapter 158 and operably connects to the rotatable ceramic disk 152 via a key 160 that is received within a slot 162 in the rotatable disk 152. A handle 164 mounts to the shaft assembly 46 to effect rotation of the shaft assembly 46.

The rotatable disk 152 and fixed disk 154 can be formed with the hole pattern disclosed in either of the previously described structures. As with the previous disk structures, the flow of water to the valve stack is through the water supply outlet 16, filter inlet 18, filter outlet 20, and spout 12.

In operation, the lever 160 rotates the handle shaft assembly to thereby rotate the rotatable disk 152 with respect to the fixed disk 154 to control the flow of water from the water supply outlet 16, into the filter inlet 18, out of the filter outlet 20, and into the spout 12 in such a manner so that the introduction of new supply water is terminated prior to the termination of water flow from the filter to the spout, preventing the buildup of pressure within the filter.

While the invention has been specifically described in connection with certain specific embodiments thereof, it is to be understood that this is by way of illustration and not of limitation.

What is claimed is:

1. A water faucet assembly for dispensing filtered water from an unfiltered water source, the water faucet assembly comprising:
    a spout having an inlet for receiving water to be directed through the spout;
    a water supply port adapted to be fluidly connected to a water source;
    a filter having an inlet for receiving unfiltered water from the water supply port and an outlet for dispensing filtered water; and
    a valve movable between an ON position, where the filter inlet is fluidly connected to the water supply port and the filter outlet is fluidly connected to the spout inlet, an intermediate position, where the filter outlet is fluidly connected to the spout inlet and the filter inlet is fluidly disconnected from the water supply port, and an OFF position, where the filter outlet is fluidly disconnected from the spout inlet and the filter inlet is fluidly disconnected from the water source;
    whereby when the water supply port is connected to a water source, fluid flow is stopped between the water supply port and the filter inlet before fluid communication is closed between the filter outer and the spout inlet as the valve is moved from the ON position to the OFF position.

2. The water faucet assembly according to claim 1 wherein the spout further comprises a base defining a valve recess in which the valve is positioned, and the water supply port, filter inlet, filter outlet, and the spout inlet are all fluidly connected to the valve recess.

3. The water faucet assembly according to claim 2 wherein the valve comprises a body and a disk stack mounted within the body, the disk stack comprises a fixed disk fixedly mounted to the body and a rotatable disk rotatably mounted to the body for relative movement with the fixed disk whereby the valve is moved between the ON, intermediate, and OFF positions by rotating the rotatable disk relative to the fixed disk.

4. The water faucet assembly according to claim 3 wherein:
    the fixed disk comprises a source opening fluidly connected to the supply port, a filter inlet opening fluidly connected to the filter inlet, a filter outlet opening fluidly connected to the filter outlet, and a spout opening fluidly connected to the spout inlet, and
    the rotating disk comprises a source passage capable of fluidly connecting and disconnecting the source opening and the filter inlet opening upon the rotation of the rotating disk, a dispensing passage capable of fluidly connecting and disconnecting the filter inlet opening and the source inlet upon rotation of the rotating disk, and when the valve is in the ON position, the source passage overlies the source opening and the filter inlet opening and the dispensing opening overlies the filter outlet and the spout opening, when the valve is in the pressure relief position the source passage does not overlie at least one of the source opening and the filter inlet opening and the dispensing passage overlies the filter outlet opening and the spout opening, and when the valve is in the OFF position the source passage does not overlie at least one of the source opening and the filter inlet opening and the dispensing passage does not overlie at least one of the filter outlet opening and the spout opening.

5. The water faucet assembly according to claim 4 wherein the rotating disk and the fixed disk are co-axial, the filter inlet opening is positioned at the center of the fixed disk, the source passage is elongate and extends radially from the center of the rotating disk, and the source opening lies within the rotational path of the source passage.

6. The water faucet assembly according to claim 5 wherein the dispensing passage is elongate and sized so that a portion of the dispensing passage overlies the filter outlet opening in the OFF position and overlies the spout opening and the filter opening in the intermediate position.

7. The water faucet assembly according to claim 6 wherein the dispensing passage is arcuate and radially centered relative to the disk stack axis so that the dispensing passage travels along a radial path as the valve is moved through the OFF, intermediate, and ON positions and the filter outlet opening and the spout opening are located along the dispensing passage radial path.

8. The water faucet assembly according to claim 4 wherein the source passage and the dispensing passage are blind openings and the source opening, filter inlet opening, filter outlet opening, and the spout opening extend entirely through the fixed disk.

9. A valve for controlling the flow of water from a water source, through a filter, and to a spout so that flow from the water source is shut off prior to cessation of flow from the filter relative to the spout, wherein the spout has an inlet for receiving filtered water from the filter and the filter has an inlet for receiving unfiltered water from a water source and an outlet for dispensing filtered water to the spout, the valve comprising:

a fixed disk having a supply port adapted to be fluidly connected to a water source, a filter inlet opening adapted to be fluidly connected to a filter inlet, a filter outlet opening adapted to be fluidly connected to a filter outlet, and a spout opening adapted to be fluidly connected to a spout; and a rotating disk rotatable relative to the fixed disk between "on" and "off" positions, the rotating disk comprising a source passage and a dispensing passage, where in the "on" position, the source passage fluidly connects the supply port and the filter inlet opening and the dispensing passage fluidly connects the filter outlet and the spout opening in the "off" position, the source passage fluidly disconnects the source opening; and the filter inlet opening and the dispensing passage fluidly disconnects the filter outlet opening from the spout opening; and intermediate the "on" and "off" positions, the source passage fluidly disconnects the source opening and the filter inlet opening while the dispensing passage fluidly connects the filter outlet opening and the spout opening.

10. The valve according to claim 9 wherein the rotating disk and the fixed disk are co-axial, the filter inlet opening is positioned at the center of the fixed disk, the source passage is elongate and extends radially from the center of the rotating disk, and the source opening lies within the rotational path of the source passage.

11. The valve according to claim 10 wherein the dispensing passage is elongate and sized so that a portion of the dispensing passage overlies the filter outlet opening in the OFF position and overlies the spout opening and the filter opening in the intermediate position.

12. The valve according to claim 11 wherein the dispensing passage is arcuate and radially centered relative to the disk stack axis so that the dispensing passage travels along a radial path as the valve is moved through the OFF, intermediate, and ON positions and the filter outlet opening and the spout opening are located along the dispensing passage radial path.

13. The valve according to claim 12 wherein the source passage and the dispensing passage are blind openings and the source opening, filter inlet opening, filter outlet opening, and the spout opening extend entirely through the fixed disk.

14. A filtered water assembly for dispensing filtered water from an unfiltered water source, the filtered water assembly comprising:

a spout having an inlet for receiving water and an outlet for dispensing water;

a filter having an inlet for receiving unfiltered water from a water source and an outlet for dispensing filtered water; and a valve comprising:
a fixed disk having a source opening fluidly connected to a source of unfiltered water, a filter inlet opening fluidly connected to the filter inlet, a filter outlet opening fluidly connected to the filter outlet, and a spout opening fluidly connected to the spout inlet; and a rotating disk having a source passage capable of fluidly connecting and disconnecting the source opening and the filter inlet opening upon the rotation of the rotating disk, a dispensing passage capable of fluidly connecting and disconnecting the filter inlet opening and the source inlet upon rotation of the rotating disk, and the rotating disk being rotatable relative to the fixed disk between an ON position, where the source passage fluidly connects the source opening and the filter inlet opening and the dispensing opening fluidly connects the filter outlet and the spout opening, a pressure relief position, where the source passage fluidly disconnects the source opening and the filter inlet opening and the dispensing passage fluidly connects the filter outlet opening and the spout opening, and an OFF position, where the source passage fluidly disconnects the source opening and the filter inlet opening and the dispensing passage fluidly disconnects the filter outlet opening from the spout opening.

15. The water faucet assembly according to claim 9 wherein the filter inlet opening is positioned at the center of the fixed disk, the source passage is elongate and extends radially from the center of the rotating disk, and the source opening lies within the rotational path of the source passage.

16. The water faucet assembly according to claim 15 wherein the dispensing passage is elongate and sized so that a portion of the dispensing passage overlies the filter outlet opening in the OFF position and overlies the spout opening and the filter opening in the intermediate position.

17. The water faucet assembly according to claim 16 wherein the dispensing passage is arcuate and radially centered relative to the disk stack axis so that the dispensing passage travels along a radial path as the valve is moved through the OFF, intermediate, and ON positions and the filter outlet opening and the spout opening are located along the dispensing passage radial path.

18. The water faucet assembly according to claim 17 wherein the source passage and the dispensing passage are blind openings and the source opening, filter inlet opening, filter outlet opening, and the spout opening extend entirely through the fixed disk.

19. The water faucet assembly according to claim 14 wherein both the source passage and dispensing passage are arcuate and radially spaced from the center of the rotating disk.

\* \* \* \* \*

UNITED STATES PATENT AND TRADEMARK OFFICE
CERTIFICATE OF CORRECTION

PATENT NO. : 6,394,127 B1  Page 1 of 1
DATED : May 28, 2002
INVENTOR(S) : Robert S. Creswell et al.

It is certified that error appears in the above-identified patent and that said Letters Patent is hereby corrected as shown below:

<u>Title page,</u>
Item [56], ABSTRACT, please replace with:

-- A faucet assembly for dispensing filtered water comprising a spout and a filter that are fluidly connected by a valve. The valve controls the flow of water to and from the filter such that water is shut off to the filter while water is permitted to flow from the filter to the spout and thereby relieve any water pressure buildup in the filter. --

Signed and Sealed this

Fourteenth Day of September, 2004

JON W. DUDAS
*Director of the United States Patent and Trademark Office*